United States Patent
Endo et al.

(10) Patent No.: US 7,120,751 B1
(45) Date of Patent: Oct. 10, 2006

(54) DYNAMIC STREAMING BUFFER CACHE ALGORITHM SELECTION

(75) Inventors: Yasahiro Endo, San Jose, CA (US); Konstantinos Roussos, Sunnyvale, CA (US)

(73) Assignee: Networks Appliance, Inc., Sunnyvale, CA (US)

( * ) Notice: Subject to any disclaimer, the term of this patent is extended or adjusted under 35 U.S.C. 154(b) by 0 days.

(21) Appl. No.: 10/216,075

(22) Filed: Aug. 9, 2002

(51) Int. Cl.
  *G06F 12/12* (2006.01)
(52) U.S. Cl. ............ 711/134; 711/135; 711/136; 711/137; 711/160; 709/226
(58) Field of Classification Search ........ 711/133–146, 711/159–160; 709/226
See application file for complete search history.

(56) References Cited

U.S. PATENT DOCUMENTS

| | | | |
|---|---|---|---|
| 5,043,885 A * | 8/1991 | Robinson ............ | 711/133 |
| 5,586,264 A | 12/1996 | Belknap et al. | |
| 5,615,362 A | 3/1997 | Jensen et al. | |
| 5,737,747 A | 4/1998 | Vishlitzky et al. | |
| 5,799,185 A | 8/1998 | Watanabe | |
| 5,854,887 A | 12/1998 | Kindell et al. | |
| 5,881,266 A * | 3/1999 | Matsumoto ............ | 711/134 |
| 5,918,020 A | 6/1999 | Blackard et al. | |
| 5,960,452 A | 9/1999 | Chi | |
| 6,085,193 A | 7/2000 | Malkin et al. | |
| 6,272,598 B1 * | 8/2001 | Arlitt et al. ............ | 711/133 |
| 6,351,471 B1 | 2/2002 | Robinett et al. | |
| 6,351,474 B1 | 2/2002 | Robinett et al. | |
| 6,366,970 B1 | 4/2002 | Wolff et al. | |
| 6,407,680 B1 * | 6/2002 | Lai et al. ............ | 341/50 |
| 6,463,508 B1 | 10/2002 | Wolf et al. | |
| 6,484,212 B1 | 11/2002 | Markowitz et al. | |
| 6,505,169 B1 | 1/2003 | Bhagavath et al. | |
| 6,516,361 B1 | 2/2003 | Lym et al. | |
| 6,593,860 B1 | 7/2003 | Lai et al. | |
| 6,594,751 B1 | 7/2003 | Leivent | |
| 6,665,755 B1 | 12/2003 | Modelski et al. | |

(Continued)

OTHER PUBLICATIONS

NetCache™ 5.1 Web Cache First-Time Configuration Guide, Network Appliance, Inc., Sunnyvale, California, Apr. 2001.

(Continued)

*Primary Examiner*—Matthew Kim
*Assistant Examiner*—Hetul Patel
(74) *Attorney, Agent, or Firm*—Blakely, Sokoloff, Taylor & Zafman LLP

(57) ABSTRACT

A streaming media cache comprises a mass storage device configured to store streaming media data, a cache memory coupled to the mass storage device, the cache memory configured to store a subset of the streaming media data in a plurality of locations, and configured to provide the subset of the streaming media data to the processor, and a processor coupled to the mass storage device and to the cache memory, the processor configured to use a first retirement algorithm to determine a first location within the cache memory that is to be retired, configured to copy data from the mass storage device to the first location within the cache memory, configured to monitor a cache memory age, wherein the cache memory age is determined in response to an age of data in at least a second location within the cache memory, configured to use a second retirement algorithm to determine a third location within the cache memory that is to be retired when the cache memory age falls below a threshold age, and configured to copy data from the mass storage device to the third location within the cache memory.

32 Claims, 7 Drawing Sheets

U.S. PATENT DOCUMENTS

| | | |
|---|---|---|
| 6,708,213 B1 | 3/2004 | Bommaiah et al. |
| 6,721,850 B1* | 4/2004 | Hofmann et al. ............ 711/133 |
| 6,742,082 B1 | 5/2004 | Lango et al. |
| 6,744,763 B1 | 6/2004 | Jones et al. |
| 6,747,991 B1 | 6/2004 | Hemy et al. |
| 6,760,765 B1 | 7/2004 | Asai et al. |
| 6,883,066 B1* | 4/2005 | Herbst et al. ............... 711/118 |
| 2001/0003193 A1 | 6/2001 | Woodring et al. |
| 2001/0034786 A1 | 10/2001 | Baumeister et al. |
| 2001/0052132 A1 | 12/2001 | Fryer |
| 2002/0029282 A1 | 3/2002 | Buddhikot et al. |
| 2002/0056126 A1 | 5/2002 | Srikantan et al. |
| 2002/0078300 A1* | 6/2002 | Dharap ....................... 711/133 |
| 2002/0097750 A1 | 7/2002 | Gunaseelan et al. |
| 2002/0116473 A1 | 8/2002 | Gemmell |
| 2002/0116585 A1* | 8/2002 | Scherr ........................ 711/133 |
| 2002/0162047 A1 | 10/2002 | Peters et al. |
| 2002/0181506 A1 | 12/2002 | Loguinov |
| 2003/0217113 A1* | 11/2003 | Katz et al. .................. 709/213 |
| 2004/0039837 A1 | 2/2004 | Gupta et al. |
| 2004/0049598 A1* | 3/2004 | Tucker et al. ............... 709/246 |
| 2005/0053034 A1* | 3/2005 | Chiueh ........................ 370/331 |

OTHER PUBLICATIONS

NetCache™ 5.1 Routine Administration Guide, Network Appliance, Inc., Sunnyvale, California, Apr. 2001.

NetCache™ 5.1 Configuration Guide, Network Appliance, Inc., Sunnyvale, California, Apr. 2001.

NetCache™ 5.1 Deployment planning Guide, Network Appliance, Inc., Sunnyvale, California, Apr. 2001.

NetCache™ 5.1 Features and Configuration Planning Guide, Network Appliance, Inc., Sunnyvale, California, Apr. 2001.

NetCache™ 5.1 Streaming Media Cache First-Time Configuration Guide, Network Appliance, Inc., Sunnyvale, California, Apr. 2001.

NetCache™ 5.1 Accelerator First-Time Configuration Guide, Network Appliance, Inc., Sunnyvale, California, Apr. 2001.

* cited by examiner

DYNAMIC STREAMING BUFFER CACHE ALGORITHM SELECTION

CROSS-REFERENCES TO RELATED APPLICATIONS

The present invention disclosure incorporates by reference for all purposes co-pending U.S. patent application Ser. No. 09/981,328, filed Oct. 16, 2001 and co-pending U.S. patent application Ser. No. 09/981,667, filed Oct. 16, 2001.

BACKGROUND OF THE INVENTION

The present invention relates to streaming media. More particularly, the present invention relates to methods and apparatus for serving of streaming media with increased performance.

Typical file caching methods include a cache receiving a file from a file server, and storing the entire file. Later, when a client desires the file, instead of serving the file from the file server, the file is served from the cache. Because the cache is typically a server that is closer to the client or has higher bandwidth than the file server, the file is served to the client quickly from the cache.

It has been discovered by the inventors, that attempting to apply typical file caching methods to files that include streaming media data, raises many new problems. For instance, serving a streaming media data file from a cache requires much more processing by the cache than with classical file transfers over the web. For example, during normal playback, the cache may need to perform a significant quantity of processing such as packet modifications, packet resequencing, packet retiming, packet assembly and other computationally intensive functions. As another example, the cache may be called upon to perform random access within the streaming media data file as a result of a client "rewind" or "fast forward" operation. Because, classical caching is typically file-based, such a random access would involve moving within a very large data file.

Another drawback is that since streaming media data files are very large, a huge penalty is incurred if the streaming media data file is deleted. Typically if a file cache determines that it needs more disk space for new files, it will first delete older files, regardless of the size. As an example, if an older file is a streaming media data file that stores an hour-long program, the entire hour-long program is deleted even if the cache only needs to free up the equivalent of 1 minute of space.

Another drawback is that many different streaming media formats exist, each with its own specific streaming requirements. Thus in contrast to classical file transfer over the web, where the files are essentially opaque to the file cache and for streaming data to clients, a streaming media cache needs to process the actual contents of the file beyond mere storage and retrieval.

An additional drawback is that typical cache retirement schemes are often not suited for streaming media data. In particular, schemes where locations within a fast cache memory are retired and replaced with "fresh" data may degrade performance of a streaming media cache. As an example, one cache retirement scheme includes removing data from a fast cache memory if the data is not used or seldom used. In contrast, it has been discovered by the inventors that data identified by such a retirement scheme represents data that will probably be required in the future. In other words, such a retirement scheme would delete data that is needed. In another example, a FIFO retirement scheme might be used in a traditional cache, i.e. the oldest data is slated for retirement. However, it has been discovered by the inventors that such a retirement scheme may delete data from the fast cache memory that could be advantageously provided to other clients from the fast cache memory.

In light of the above, what is required are improved methods and apparatus for serving streaming media to client systems with increased performance capabilities. Further, what is required are methods and apparatus for providing such solutions in economical ways.

BRIEF SUMMARY OF THE INVENTION

The present invention relates to streaming media caches. More particularly, the present invention relates to methods and apparatus for providing streaming media data from a streaming media cache with increased performance.

In the present disclosure "Streaming media" data (also data stream, stream, or the like) generally refers to media intended to be transported at a select (often, subscribed) bit rate, and with a desired timeliness. The streaming media is adapted for playback in a desired order without regard to the order the streaming media data are received by a client system. Streaming media generally conforms to a real-time delivery protocol, such as, e.g., RTSP, RTP, or the like. The media (media clip) represented in the streaming media data may include static images, video data, audio data, executable files, presentation data, applet data, data files, and the like.

According to one aspect of the invention, a method for operating a streaming media cache including a cache memory is described. One process may include utilizing a first buffer location retirement algorithm to determine a first location within a cache memory that is to be retired, writing data from a mass storage device to the first location within the cache memory, and monitoring a cache memory age, the cache memory age determined in response to an age of data in at least a second location with the cache memory. Other processes may also include utilizing a second buffer location retirement algorithm to determine a third location within the cache memory that is to be retired, when the cache memory age falls below a first threshold age; and writing data from the mass storage device to the third location within the cache memory.

According to another aspect of the invention, a streaming media cache is described. One such device includes a mass storage device configured to store streaming media data, and a cache memory coupled to the mass storage device, the cache memory configured to store a subset of the streaming media data in a plurality of locations, and configured to provide the subset of the streaming media data to the processor. Additionally, a processor coupled to the mass storage device and to the cache memory, is included. The processor configured to use a first retirement algorithm to determine a first location within the cache memory that is to be retired, configured to copy data from the mass storage device to the first location within the cache memory; configured to monitor a cache memory age, wherein the cache memory age is determined in response to an age of data in at least a second location within the cache memory; configured to use a second retirement algorithm to determine a third location within the cache memory that is to be retired when the cache memory age falls below a threshold age; and configured to copy data from the mass storage device to the third location within the cache memory.

According to yet another aspect of the invention, a computer program product for a streaming media cache including a processor and a cache buffer is disclosed. The computer program product includes code that directs the processor to determine a first location within the cache buffer that is to be retired in response to a first retirement algorithm, code that directs the processor to write data from a mass storage device to the first location, and code that directs the processor to determine a cache buffer age in response to an age of data within a second location within the cache memory. Additionally, the computer program product may include code that directs the processor to compare the cache buffer age to a first threshold age, code that directs the processor to determine a third location within the cache buffer that is to be retired in response to a second retirement algorithm when the first threshold age exceeds the cache buffer age, and code that directs the processor to write data from the mass storage device to the third location. The codes typically reside on a tangible media such as a hard disk drive or a computer memory.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1A:
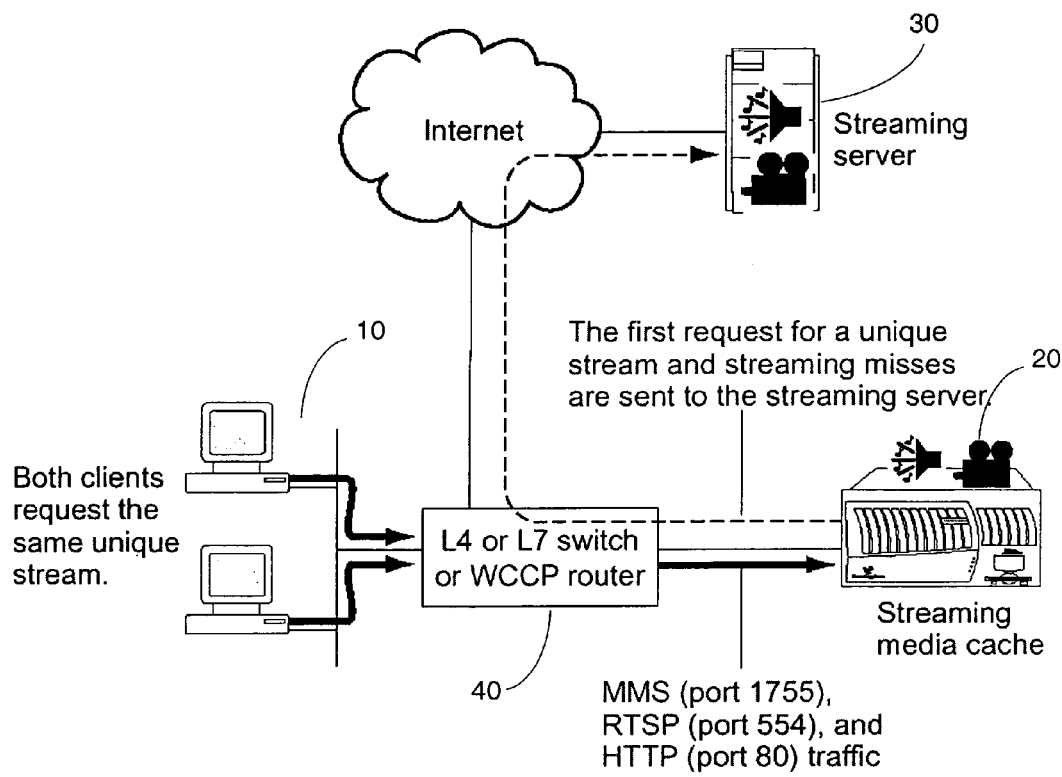
FIGS. 1A–B illustrate overview diagrams according to embodiments of the present invention.

FIG. 1A illustrates a overview diagram according to an embodiment of the present invention. In particular, FIG. 1A includes a client system 10, a streaming media cache (server) 20, media data server 30 (streaming server), and a router 40. The elements of FIG. 1A are coupled as disclosed over computer networks such as a local area network, wide area networks (Internet), wireless networks or the like.

In one embodiment, client system 10 initially makes a request for a stream of streaming media. The media (media clip) may include static images, video data, audio data, executable files, and the like. This request may take the form of a user clicking upon a URL on a web page, or the like. In this embodiment, this request is intercepted by router 40. Router 40 may be embodied as a layer 4 or layer 7 switch, a Web Cache Coordination Protocol (WCCP) router, or any other conventional switch or router. In such embodiments, router 40 would be configured to recognize when a request is made by client system 10 for a stream of streaming media. For example, a request for a file with a suffix of .asx, .asf, .nsc, .rm, .ram, or the like.

If such a request is determined by router 40, that request is redirected to streaming media cache 20, and not media data server 30. Once streaming media cache 20 receives the request, it makes a determination whether the stream (the media clip) or the requested portion of the stream (the request portion of the media clip) has already been cached. If the data has been previously stored, streaming media cache 20 provides the streaming media to client system 10. In embodiments of the present invention, streaming media cache 20 is also a web proxy cache that handles http requests in addition to the streaming media files. In alternative embodiments, a separate web proxy cache may be used.

In the present embodiment, if the data (requested portion of a stream) has not previously been stored in streaming media cache 20, as when the data is "live" data, streaming media cache 20 sends a request to media server 30 for the live stream of data. As the live stream of data is delivered to streaming media cache 20, it is forwarded to client system 10, and the portion of the stream of data is stored.

For this embodiment, the streaming media traffic is received by media cache 20 from specific ports. In specific embodiments, for RealNetworks RealSystem streaming media, media cache 20 receives streaming media via TCP on port 554; for QuickTime (RTSP) streaming media, media cache 20 receives streaming media via TCP on port 554 and/or via UDP on port 2001; for Microsoft Media Streaming (MMS) streaming media, media cache 20 receives streaming media data via TCP on port 1755; and for HTTP streaming media, media cache 20 receives streaming media data via TCP on port 80, or the like. In other embodiments, other ports for the streaming media may also be used.

The embodiment illustrated above is configured to be accessible from client system 10 via a local area network. It should be understood that streaming media cache 20 may be alternatively positioned at other points in the network, for example, at the edge of a point of presence network on the Internet, and the like. An example is illustrated in FIG. 1B.

Figure 1B:
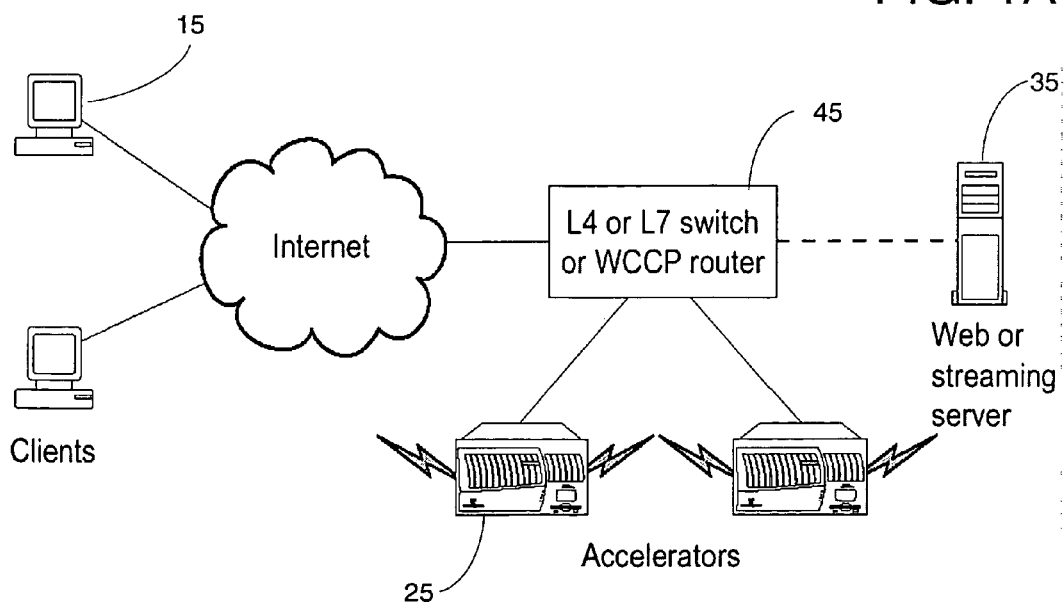

FIG. 1B illustrates an overview diagram according to another embodiment of the present invention. In particular, FIG. 1B includes a client system 15, a streaming media cache 25, media data server 35 (streaming server), and a router 45. The elements of FIG. 1B are coupled as disclosed over computer networks such as a local area network, wide area networks (Internet), wireless networks or the like. In this embodiment, streaming media cache 25 may be embodied as an accelerator on the edge of a point of presence (POP).

In this embodiment, client system 15 initially makes a request for a stream of streaming media (representing a streaming media clip). This request may take the form of a user clicking upon a URL on a web page, or the like. In this embodiment, the request is passed over the wide area network and is intercepted by router 45. Router 45 may be embodied as a layer 4 or layer 7 switch, a WCCP router, or any other conventional switch or router. In this embodiment, router 45 would be configured to recognize when a request is made by client system 15 for a stream of streaming media.

If such a request is determined by router 45, that request is redirected to streaming media cache 25, and not media data server 35. Once streaming media cache 25 receives the request, it makes a determination whether the streaming media clip or the requested portion of the streaming media clip has already been cached. If the data has been previously stored, streaming media cache 25 provides the streaming media to client system 15.

In the present embodiment, if the data is not stored in streaming media cache 25, streaming media cache 25 sends a request to media server 35 for the missing data. As the stream of data (including the portion of the streaming media clip) is delivered to streaming media cache 25, it is forwarded to client system 15. The missing portion of the streaming media clip is then stored in streaming media cache 25. Details of the storage format and the process of storing and retrieving the stream of data are described in greater detail in the applications cited above.

For this embodiment, the streaming media traffic is sent by media cache 25 to specific ports. In specific embodiments, for RealSystem streaming media, media cache 25 sends streaming media via TCP on port 554; for QuickTime (RTSP) streaming media, media cache 25 sends streaming media via TCP on port 554 and/or via UDP on port 2001; for Microsoft Media Streaming (MMS) streaming media, media cache 25 sends streaming media data via TCP on port 1755; and for HTTP streaming media, media cache 25 sends streaming media data via TCP on port 80, or the like. In other embodiments, other ports for the streaming media may also be used.

In other embodiments of the present invention, one or more streaming media caches may be positioned simultaneously at the illustrated locations between client system 15 and media server 35. Additional streaming media caches may also be positioned at other locations between client system 15 and media server 35, for example at a user ISP, on an intranet, and the like. In light of this disclosure, it will be apparent that many other network configurations can incorporate embodiments of the present invention.

Figure 2:
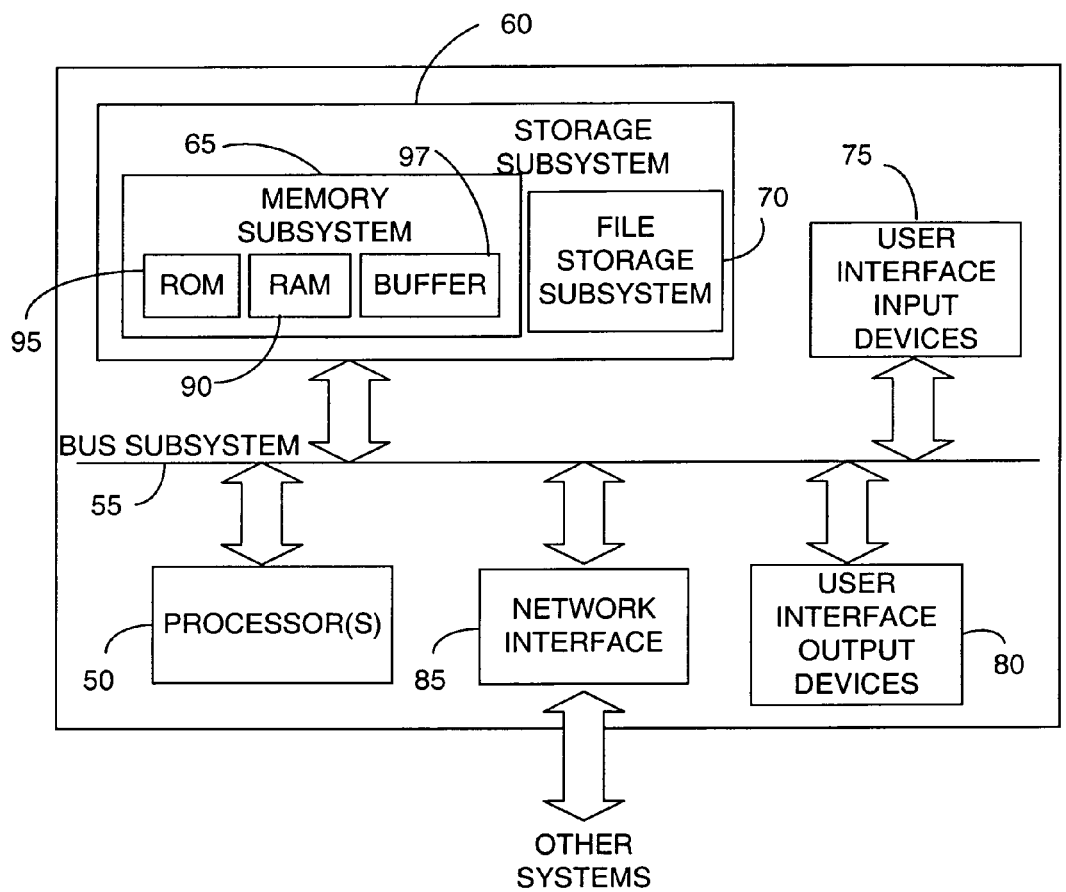
FIG. 2 is a simplified block diagram of a computer system according to an embodiment of the present invention.

FIG. 2 is a simplified block diagram of a computer system 49 according to an embodiment of the present invention. Computer system 49 may be used as client system 10, streaming media cache 20, and/or media data server system 30. Computer system 49 may be a stand-alone computer system, a computer "appliance," or the like.

As shown in FIG. 2, computer system 49 includes at least one processor 50, which communicates with a number of peripheral devices via a bus subsystem 55. These peripheral devices may include a storage subsystem 60, comprising a memory subsystem 65 and a file storage subsystem 70 user interface input devices 75, user interface output devices 80, and a network interface subsystem 85. The input and output devices allow user interaction with computer system 49. A user may be a human user, a device, a process, another computer, and the like.

Network interface subsystem 85 provides an interface to other computer systems. Embodiments of network interface subsystem 85 include an Ethernet card, a modem (telephone, satellite, cable, ISDN), (asynchronous) digital subscriber line (DSL) units, and the like. Network interface 250 is coupled to a typical network as shown.

User interface input devices 75 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information using computer system 49.

User interface output devices 80 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 49.

Storage subsystem 60 may be configured to store the basic programming and data constructs that provide the functionality of the computer system and of the present invention. For example, according to an embodiment of the present invention, software modules implementing the functionality of the present invention may be stored in storage subsystem 60. These software modules may be executed by processor (s) 50 of computer system 49. In a distributed environment, the software modules may be stored on a plurality of computer systems and executed by processors of the plurality of computer systems. Storage subsystem 60 may also provide a repository for storing various databases that may be used to store information such as a cache entry hash table. Storage subsystem may also function as a cache of streaming media cache 20. Storage subsystem 60 may comprise memory subsystem 65 and file storage subsystem 70.

Memory subsystem 65 may include a number of memories including a main random access memory (RAM) 90 (e.g. SDRAM, RDRAM) for storage of instructions and data during program execution and a read only memory (ROM) 95 (e.g. flash memory, EEPROM, UVPROM) in which fixed instructions are stored. RAM 90 is typically also used for execution of programs, storage of data, and the like.

File storage subsystem 70 provides persistent (non-volatile) storage for program and data files, and may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers.

A memory buffer 97 is also provided in storage subsystem 60. In this embodiment, memory buffer 97 is a special buffer memory coupled to file storage subsystem 70. More specifically, memory buffer 97 provides a temporary storage area for data retrieved from and data sent to file storage subsystem 70. Memory buffer 97 may also provide a temporary storage area for data received from a streaming media server (or other upstream server) and for data to be sent to client systems. The type of data may include streaming media payload data.

In the present embodiment, computer system 49 typically also includes software that enables it to send and receive data and communications to and from client systems 10 and media data server 30 using communications protocols including, HTTP, S-HTTP, TCP/IP, UDP, SSL, RTP/RTSP and the like. In alternative embodiments of the present invention, other software and transfer and communication protocols may also be used, for example IPX, UDP or the like.

Bus subsystem 55 provides a mechanism for letting the various components and subsystems of computer system 49 communicate with each other as intended. The various subsystems and components of computer system 49 need not be at the same physical location but may be distributed at various locations within a network. Although bus subsystem 55 is shown schematically as a single bus, alternative embodiments of the bus subsystem may utilize multiple busses.

Computer system 49 itself can be of varying types including a personal computer, a portable computer, a workstation, a computer terminal, a network computer, a mainframe, a kiosk, a personal digital assistant (PDA), a wireless communication device such as a mobile phone, an entertainment console (PS2, X-Box, GameCube) or any other data processing system. Due to the ever-changing nature of computers and networks, the description of computer system 49 depicted in FIG. 2 is intended only as a specific example for purposes of illustrating an embodiment of the computer system.

In one embodiment, computer system 49 is embodied as a network cache (appliance) in a product called "NetCache" available from NetworkAppliance, Incorporated. The Net-Cache family of products currently includes the NetCache C1100, NetCache C3100, and NetCache C6100 including proprietary, but available hardware and software. Embodiments of the present invention may also be implemented in future additions to the NetCache family of products.

It will be readily apparent to one of ordinary skill in the art that many other hardware and software configurations are suitable for use with the present invention. For example, other types of processors are contemplated, such as the Opteron™ or AthlonXP™ class microprocessors from AMD, the PentiumIV™ or Celeron™-class microprocessors from Intel Corporation, PowerPC™ G3 or G4 microprocessors from Motorola, Inc., Crusoe™ processors from Transmeta, Inc. and the like. Further, other types of operating systems are contemplated in alternative embodiments including WindowSXP™ WindowsNT™ from Microsoft, Solaris from Sun Microsystems, LINUX, UNIX, MAC OS X™ from Apple Computer Corporation, and the like. Many other configurations of a computer system are possible having more or fewer components than the computer system depicted in FIG. 2.

Figure 3:
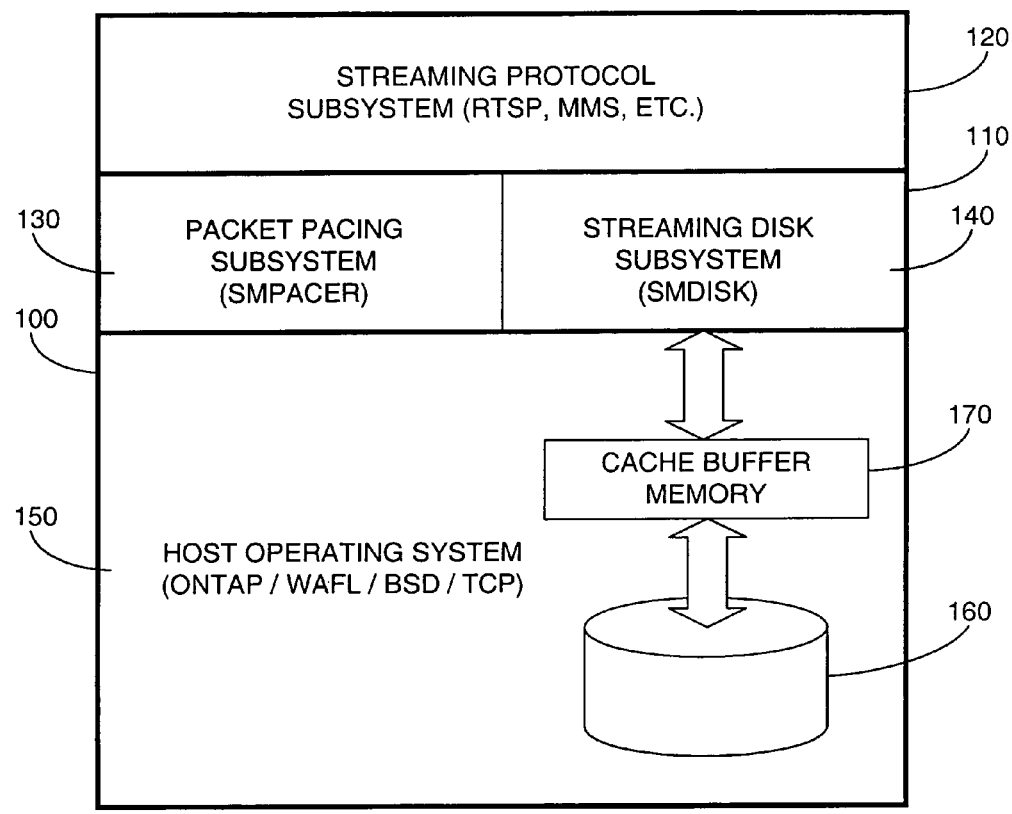
FIG. 3 illustrates a software hierarchy according to embodiments of the present invention.

FIG. 3 illustrates a software hierarchy according to embodiments of the present invention. In particular, FIG. 3 includes a three-tiered hierarchy including an operating system level (layer) 100, a data handling level (layer) 110, and a protocol level (layer) 120.

In the present embodiment, operating system level (layer) 100 includes portions of the Berkeley Software Distribution (BSD) operating system. Additionally, operating system level 100 includes software 150 provided by the assignee of the present invention: Data ONTAP™, a Network Appliance brand operating system. Data ONTAP™ utilizes a file system called Write Anywhere File Layout (WAFL™), a Network Appliance brand file system. In the present embodiment, the Data ONTAP™ operating system provides efficient file service by using this file-system technology and a microkernel design geared towards network data access.

In this embodiment, the WAFL™ file system provides efficient file storage to and retrieval from a physical memory 160, such as a mass storage device such as a disk drive. Further, the WAFL™ file system provides these operations upon efficient access algorithms and data structures. A large and fast memory buffer (also termed cache buffer or cache memory) 170 is provided between physical memory 160 and data handling layer 110. In the present embodiment, memory buffer 170 includes 256 Mbytes of random access memory (RAM) such as DDR SDRAM, RDRAM, or the like. The memory buffer 170 is segmented into four portions, each portion having access to physical memory 160. In one embodiment, each portion can retrieve 4 Kbytes of data from physical memory 160 at a time, accordingly 16 Kbytes of data can be retrieved from physical memory 160 at a time.

Additionally, network communications using Transmission Control Protocol (TCP) and UDP are also supported at operating system level 100. Of course other types of operating systems can also be used.

As illustrated in FIG. 3, data handling level (layer) 110 includes a packet pacing subsystem (SMPACER) 130 and a streaming disk subsystem (SMDISK) 140. In the present embodiment, streaming disk subsystem 140 is used to retrieve data packets from the file system and to provide the data to SMPACER 130. As described in the patent application cited above, in one embodiment, SMDISK 140 receives streaming media data packets and in turn SMDISK 140 creates a series of specialized data objects for storing the data. Further, SMDISK 140 receives the specialized data objects from the file system and stores the data packets into a buffer for output as streaming media.

In this embodiment, SMPACER 130 receives data packets (meta-data and payload data) via a pointer to a buffer location or the like from SMDISK 140. In turn, SMPACER 130 sends the pointers to protocol level (layer) 120. As described in the cited patent applications, protocol level 120 formats the packets according to the desired streaming protocol. The formatted streaming packets are then received by SMPACER 130. Based upon delivery times for each packet, SMPACER 130 then sends a stream of packets to the client system at the desired rate. In particular, protocol level 120 "filters" or adjusts the "delivery time" of packets to be output to clients, and the like. The adjusted meta-data and the payload data are then output by SMPACER 130 to a client, based upon the adjusted delivery time.

In this embodiment, protocol level 120 includes support for at least one, but typically for more than one streaming media protocols. The support includes encoding of data to form streams of streaming media and decoding of streams of streaming media. In one example, a streaming media protocol is the Microsoft Media Streaming (MMS) protocol. By supporting the MMS protocol, streams of MMS formatted data can be received from a streaming media (upstream or origin) server and the streamed (payload) data can be retrieved. This payload data can be sent to data handling layer 110 via SMDISK 140 for storage. Additionally, payload data determined by SMDISK 140 can be encoded into streams of MMS data. The encoded data are then sent to SMPACER 130 for paced delivery to a client system. The client system may play the encoded data via a player such as Microsoft Windows Media Player, and the like.

In another example, a streaming media protocol is the Real Time Streaming Protocol (RTSP). In addition to RTSP support, one embodiment includes Apple QuickTime format support and RealNetworks RealSystem format support. By supporting these protocols, streams of QuickTime formatted data or RealSystem data can be received from streaming media servers and the respective streaming (payload) data are retrieved. These payloads are then sent to data handling layer 110 via SMDISK 140 for storage. Additionally, payload data from SMDISK 140 can be encoded into streams of data and delivered to the client by SMPACER 130. The streaming data can be played on client systems via a QuickTime player or a RealSystem player, and the like. In other embodiments, other types of streaming media encoding schemes may be supported.

The above hierarchy has been described in embodiments as being implemented via software. However, it should be understood that some functions may be implemented in hardware or firmware. Accordingly, additional embodiments of the above may be implemented via hardware, firmware, software, and combinations thereof. Further description of SMPACER 130 is given in the referenced patent application.

Figure 4A:
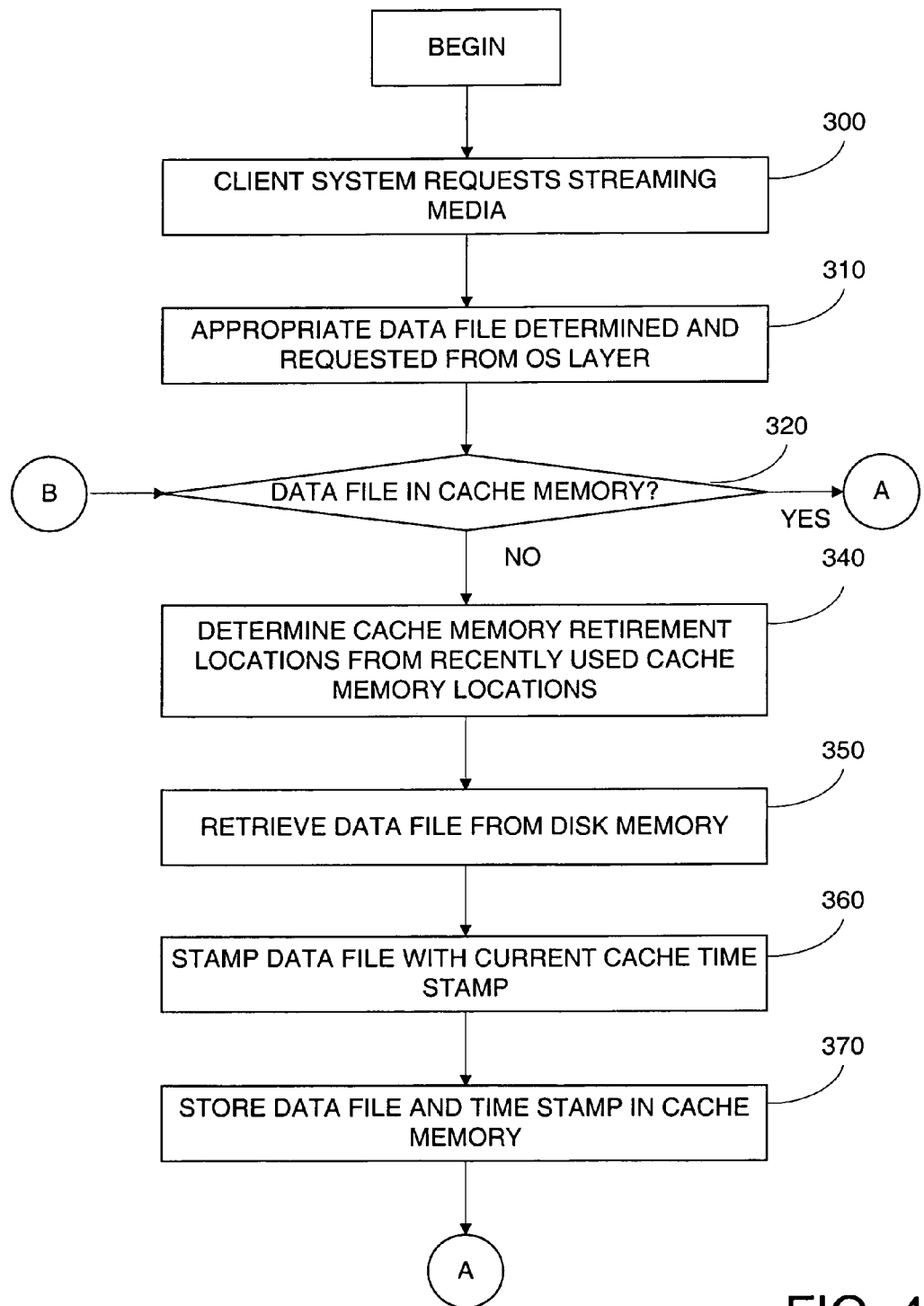
FIGS. 4A–C illustrate a flow diagram according to an embodiment of the present invention.
Figure 4B:
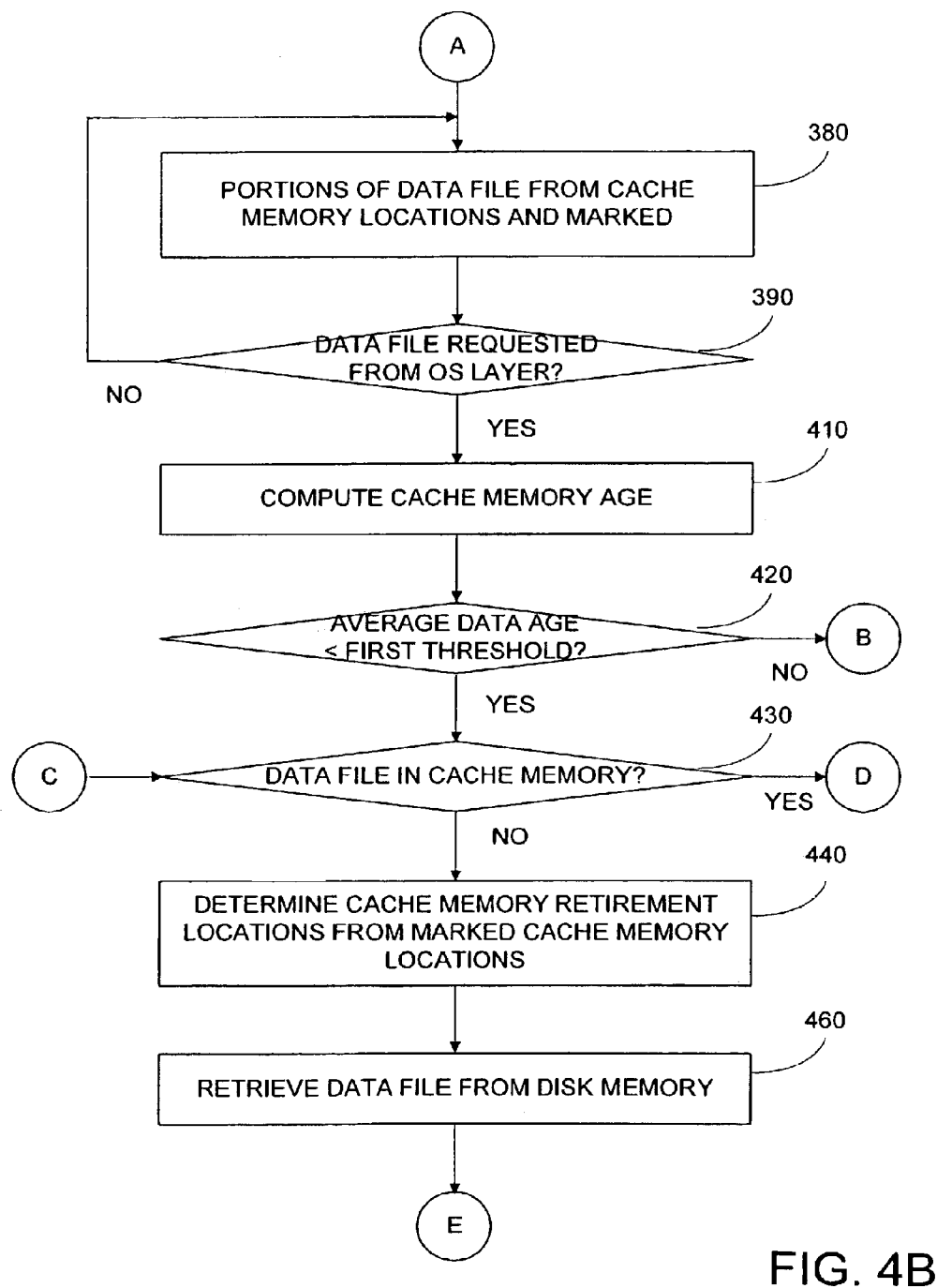
Figure 4C:
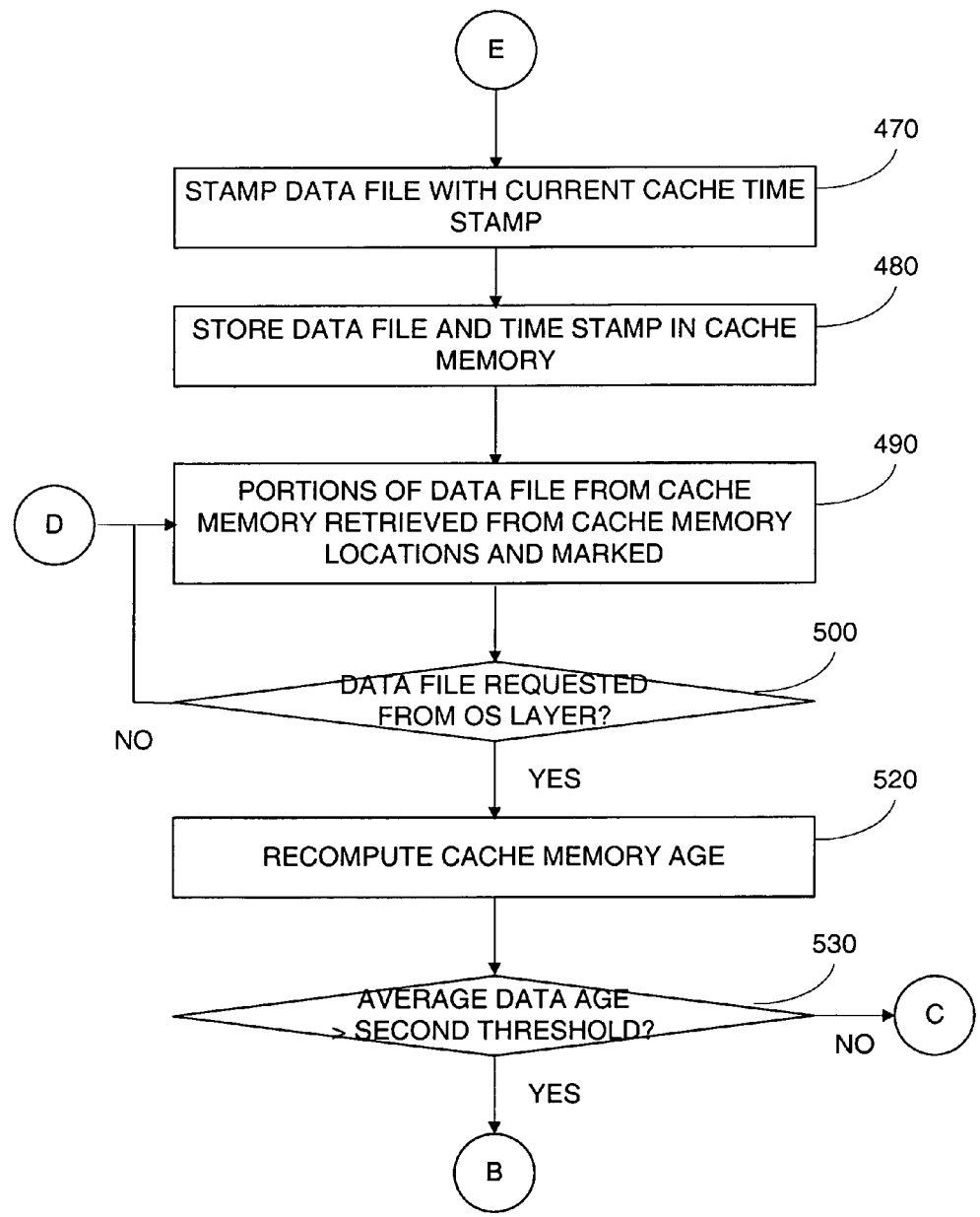

FIGS. 4A–C illustrate a flow diagram according to an embodiment of the present invention.

Initially, a client system, such as client system 10, requests streaming data from a streaming media cache, such as streaming media cache 20, step 300. This request for streaming data is processed, and SMDISK 140 makes a request for data file(s) or data object from operating system layer 100, step 310. In response to the request, a determination is made as to whether the data files reside with cache memory 170, step 320. This may be done using conventional cache look-up techniques.

In this embodiment, if the data file does not reside within cache memory 170, streaming media cache 20 determines retirement locations within cache memory 170, step 340. These retirement locations may then be used below as locations for the data file when it is retrieved.

In this example, the locations storing the least or not-often used data are slated for retirement and for being written over with new data. One embodiment uses an algorithm known as a least recently used (LRU) algorithm for determining which locations in the cache memory should be slated for retirement. In one embodiment, each time new data are stored within locations within the cache memory the location is associated with a time stamp. In the present example, when a cache memory location is accessed by SMDISK 140, the associated time stamp is removed or deleted. Further, when SMDISK 140 is finished using the data in the cache memory location, the last-accessed time stamp is updated with the current time stamp.

Thus, according to one embodiment, the least recently used or not-often used locations can be identified by looking at the last-accessed time stamp of the data compared with the current time stamp. Further, in one embodiment of the present embodiment, the number of locations slated for retirement are equal to or greater than the number of locations required for the new data file.

In this example, the data file is then retrieved from (physical) disk memory 160, step 350. Typically the time required to retrieve and store the data file from disk memory 160 to cache memory 170 is large in comparison to the time required to retrieve the data file from cache memory 170. At step 360, the data file retrieved from physical memory 160 are time stamped, and then stored within cache memory 170, step 370. In this embodiment, the data file is typically associated with a cache time stamp of when it is retrieved, and then the data file and the associated cache time stamps are stored within locations within cache memory 170.

In the present embodiment, media data representing approximately ten seconds worth of streaming media data are retrieved at a time. Depending upon the encoding bit rate of the media data, the size of the memory access can range from tens of kilobytes of data up to several megabytes of data. It is contemplated that the encoding bit rates may be greater in the future, accordingly, larger amounts of data access will be required.

Ten seconds is selected for the amount of streaming media data to be retrieved in the present embodiment. In other embodiments, greater amount of time, or even a smaller amount of time may be selected. One implication of the amount of time is that the data that is retrieved must be stored in the cache for at least that period of time, and most cases for longer periods. In other words, the data stored in the cache should be accessible by SMDISK 140 for at least the amount of time it will take the system to stream the data to the client. If cache space is limited and media data is retired before it can be streamed in its entirety, then SMDISK 140 will need to retrieve the same piece of data multiple times. Accordingly, in the present embodiment, the amount of play time represented by the media data should not be too large.

After cache memory 170 stores the data file within cache memory 170, SMDISK 140 may retrieve the data file, step 380. When SMDISK 140 accesses locations within cache memory 170 to retrieve the data file, the location is "marked" as being accessed. In this example, typical data files store a pre-determined amount of streaming media data. For example, a data file may include streaming media data that when played to a client system will play for 10 seconds, 20 seconds, or the like, as discussed in the co-pending application discussed above. Further, in the present embodiment, SMDISK 140 retrieves only portions "data chunks" of the data file at a time. When each data chunk is retrieved by SMDISK 140, that data chunk is "marked" as read.

In the present embodiment, SMDISK 140 makes another request for a data file, step 390. SMDISK 140 may make this request in response to request from client system 10 or another client system requesting a new portion of a stream of data. Alternatively, SMDISK may automatically make this request. For example, SMDISK 140 may have retrieved a first data file from cache memory 170 and have provided it to SMPACER 130; subsequently SMDISK 140 may make a request for a second data file from cache memory 170. In this example, the second data file may include streaming media data that is chronologically after streaming media data in the first data file.

Next, an age (cache memory age) for data stored in cache memory 170 is determined, step 410. In one embodiment of the present invention, the cache memory age is determined by determining the age of data stored in one or more locations within cache memory 170. The age of data may be determined by comparing the cache time stamp of when the data was last accessed to the current cache time stamp.

In the present embodiment, the cache memory age is determined by examining a time stamp of the memory location of the least recently used piece of data. In other embodiments where the age of data in more than one location is used, the cache memory age may be the average of more than one memory location.

The cache memory age is then compared to a threshold age, step 420. In this embodiment, when the average age of data in cache memory 170 rises, it implies that the number of reads from physical memory 160 is lower; further, when the average age of data in cache memory 170 drops, it implies that the number of reads from physical memory 160 increases. According to the present embodiment, when the cache memory age drops below the threshold age, as will be discussed below, a different retirement algorithm than in step 340, is used; further, if the cache memory age remains above the threshold age, the same retirement algorithm can be used.

In one embodiment, the threshold age may be set in terms of seconds, such as about 15 seconds, 20 seconds, or the like when the data files include about 10 seconds of streaming media data. In other embodiments, the threshold age is set typically higher than the amount of streaming media data within a data file (data object).

A next step is to determine whether the requested data file(s) reside with cache memory 170, step 430. Again, this may be done using conventional cache look-up techniques. If not, retirement locations within cache memory 170 are identified for retirement, step 440.

In this embodiment, locations that include data that are marked as accessed and have been released by SMDISK 140 is subject to retirement, step 450. In one embodiment, the locations that are most recently marked are retired before other locations within cache memory 170. Such an embodiment is known herein as a most recently used (MRU) retirement algorithm. In one embodiment of the present embodiment, the number of locations slated for retirement are equal to or greater than the number of locations required for the new data file.

In this example, the data file is then retrieved from physical memory 160, step 460. Next, the data file retrieved from physical memory 160 are time stamped, step 470, and then stored within cache memory 170, step 480. In this embodiment, the data file is typically associated with a cache time stamp of when it is retrieved, and then the data file and associated cache time stamps are stored within locations within cache memory 170.

After cache memory 170 stores the data file within cache memory 170, SMDISK 140 may retrieve the data file, step 490. Again, when SMDISK 140 accesses locations within cache memory 170 to retrieve the data file, the location is "marked" as being accessed. In this example, a data file may include streaming media data that when played to a client system will play for 10 seconds, 20 seconds, or the like, as discussed in the co-pending application discussed above. Further, in the present embodiment, SMDISK 140 retrieves only portions "data chunks" of the data file at a time. When each data chunk is retrieved by SMDISK 140, that data chunk is again "marked" as read.

In the present embodiment, SMDISK 140 makes another request for a data file, step 510. SMDISK 140 may make this request in response to request from client system 10 or another client system requesting a new portion of a stream of data. Alternatively, SMDISK may automatically make this request. For example, SMDISK 140 may have retrieved a first data file from cache memory 170 and have provided it to SMPACER 130; subsequently SMDISK 140 may make a request for a second data file from cache memory 170. In this example, the second data file may include streaming media data that is chronologically after streaming media data in the first data file.

Next, the cache memory age for data stored in cache memory 170 is again determined, step 520. In one embodiment of the present invention, the cache memory age is similarly determined by determining the age of data stored in one or more locations within cache memory 170 in comparison to the current time.

In this embodiment, the cache memory age is then compared to an additional threshold age, step 530. In this embodiment, when the average age of data in cache memory 170 rises, it implies that the number of reads from disk memory 160 is lower.

In one embodiment, the additional threshold age may be set in terms of seconds, such as about 20 seconds, 30 seconds, or the like when the data files include about 10 seconds of streaming media data. In other embodiments, the additional threshold age is set typically higher than the threshold age in step 420, and higher than the amount of streaming media data within a data file (data object).

According to the one embodiment, when the cache memory age rises above the additional threshold age, the retirement algorithm (LRU) discussed in step 340, is again used for retirement purposes.

In one embodiment, cache memory 170 slowly transitions back to using the LRU algorithm. This gentle transition is facilitated by selectively applying LRU replacement method instead of the MRU retirement method to probabilistically-selected cache memory locations. From the standpoint of cache memory age, cache memory 170 using a LRU has less desirable traits than cache memory 170 using a MRU replacement method on a streaming workload. Accordingly, in one embodiment, by selectively applying LRU methods while closely monitoring the cache age and reverting to MRU methods, as necessary, an abrupt drop in the cache age is avoided. For example, initially cache memory 170 use the LRU retirement algorithm, then when the cache memory age drops below a first threshold, cache memory 170 uses the MRU retirement algorithm, as described above. In this case, all the cache memory retired will be retired using the MRU algorithm. Next, if the cache age rises above the second threshold (step 530) one out of N pieces of cache memory retired will be retired using the LRU algorithm and the remaining (N−1) pieces of cache memory will be retired using the MRU algorithm. Later, if the cache age keep increasing beyond the second threshold even with the selective use of LRU algorithm, the system will again switch itself to use the LRU algorithm to make every retirement decision.

Figure 5:
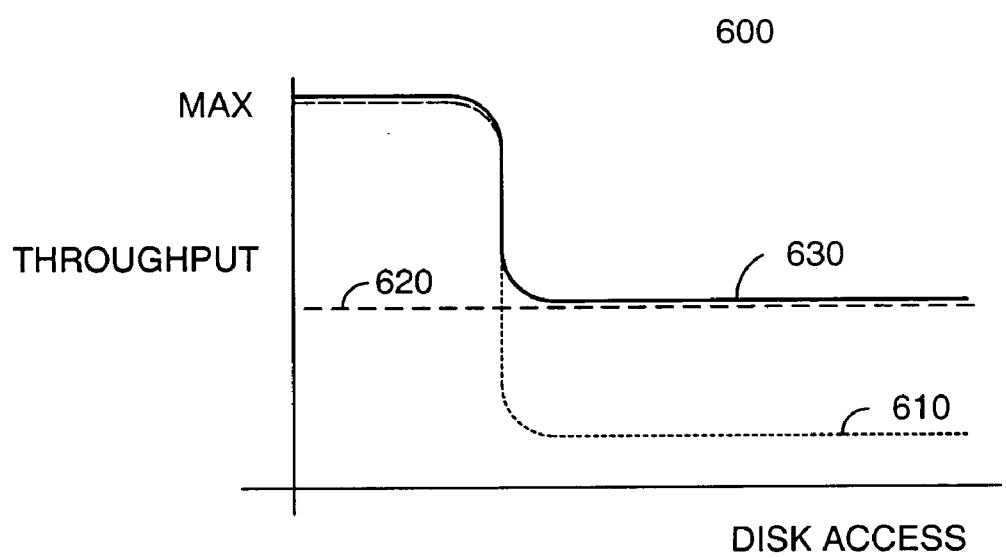
FIG. 5 illustrates graphical representations of experimental results.

FIG. 5 illustrates a graphical representations of experimental results. In particular, a graph 600 illustrates the amount of disk memory throughput is illustrated on the x-axis versus disk traffic (total size of streaming data files accessed) on the y-axis.

In graph 600, the LRU method shows good cache hit rate for low traffic situations, i.e. because the number of cache hits is higher, the number of disk memory accesses are lower, and the throughput is high. However, as the disk traffic increases, the cache memory hit rate rapidly deteriorates, 610. This drop in the hit rate is associated with a drop in the cache age, an increase in disk memory accesses, and a decrease is throughput. Further, graph 600 illustrates, the MRU retirement method showing a relatively constant cache hit rate for various disk memory traffic, 620.

In this embodiment, illustrated by dotted line 630, for low traffic situations, the LRU replacement method is used for the cache memory. As the amount of traffic increases, and the cache age of the least recently used cache memory location drops, the throughput drops. According to this embodiment, when the cache memory age drops below a threshold, the cache memory switches from the LRU method to the MRU replacement method. Accordingly, instead of bottoming at a low throughput as illustrated in 610, the throughput "bottoms out" as the MRU throughput level 620.

As can be seen above, the experimental results of embodiments of the present invention dramatically reduce the number of disk accesses. By reducing the number of disk accesses, the number of physical disk drive required to support a given amount of streaming traffic is advantageously reduced. Further, because these disk accesses are processor intensive, the effect is to reduce the processor load of the streaming media cache. In response, the number of client systems that may be supported by the streaming media cache may be increased; the number of streaming media caches in a network may be reduced; and the like.

In view of the above disclosure, many other variations can be envisioned. For example, many different types of retirement algorithms can be used in combination. As examples, the first algorithm may be a LRU, and the second may be a FIFO; the first algorithm may be a FIFO and the second may be a MRU, and the like. In still other embodiments, the use of other types of retirement algorithms is contemplated.

The invention has been described in embodiments above as a file cache or a streaming media cache. It should be understood, however, that, embodiments may be embodied in any computer system as a stand-alone system, or as part of another system. For example, one embodiment may be integrated into a computer system that includes web server software, database software, and the like. As another example, one embodiment may be distributed among a set of computer systems in a network, or the like. In similar examples, when there is a miss, embodiments of the present invention may access other embodiments in the network (upstream servers) before attempting to access an origin server, or the like.

In other embodiments of the present invention, combinations or sub-combinations of the above-disclosed invention can be advantageously made. The block diagrams of the architecture and flowcharts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for operating a streaming media cache including a cache memory, the method comprising:
   utilizing a first buffer location retirement algorithm to determine a first location within a cache memory that is to be retired;
   writing data from a mass storage device to the first location within the cache memory;
   monitoring a cache memory age, the cache memory age determined in response to an age of data in at least a second location within the cache memory;
   utilizing a second buffer location retirement algorithm to determine a third location within the cache memory that is to be retired, when the cache memory age falls below a first threshold age; and
   writing data from the mass storage device to the third location within the cache memory.

2. The method of claim 1 wherein the first buffer location retirement algorithm comprises a least recently used retirement algorithm.

3. The method of claim 2 wherein the second buffer location retirement algorithm comprises a most recently used retirement algorithm.

4. The method of claim 2 wherein the second buffer location retirement algorithm comprises a first-in first-out retirement algorithm.

5. The method of claim 2 further comprising:
   utilizing the least recently used retirement algorithm to determine a fourth location within a cache memory that is to be retired, when the cache memory age exceeds a second threshold age; and
   writing data from the mass storage device to the fourth location within the cache memory.

6. The method of claim 5 wherein the first threshold age is less than the second threshold age.

7. The method of claim 2 wherein the age of data in the second location is determined in response to a time stamp for the data in the second location and in response to a current time stamp.

8. A streaming media cache comprising:
   a mass storage device configured to store streaming media data;
   a cache memory coupled to the mass storage device, the cache memory configured to store a subset of the streaming media data in a plurality of locations; and
   a processor coupled to the mass storage device and to the cache memory, the processor configured to use a first retirement algorithm to determine a first location within the cache memory that is to be retired, configured to copy data from the mass storage device to the first location within the cache memory; configured to monitor a cache memory age, wherein the cache memory age is determined in response to a time stamp of at least a second location within the cache memory; configured to use a second retirement algorithm to determine a third location within the cache memory that is to be retired when the cache memory age falls below a threshold age; and configured to copy data from the mass storage device to the third location within the cache memory.

9. The streaming media cache of claim 8 wherein the first retirement algorithm comprises an algorithm configured to identify a least recently used location within the cache memory, wherein the least recently used location comprises a location within the cache memory including a subset of the streaming media data associated with a time stamp older than time stamps associated with other locations within the cache memory.

10. The streaming media cache of claim 9 wherein the second retirement algorithm comprises an algorithm configured to identify a most recently used location within the cache memory, wherein the most recently used location comprises a location within the cache memory including a subset of the streaming media data that has most recently been provided from the cache memory to the processor.

11. The streaming media cache of claim 10 wherein the processor is further configured to use the first retirement algorithm to determine a fourth location within the cache memory that is to be retired when the cache memory age rises above a second threshold age, and configured to copy data from the mass storage device to the fourth location within the cache memory.

12. The streaming media cache of claim 10 wherein the first threshold age is less than the second threshold age.

13. The streaming media cache of claim 12 wherein the first threshold age is selected from the range: about 10 seconds to about 20 seconds.

14. The streaming media cache of claim 10 wherein the age of data in the second location within the cache memory is determined in response to a time stamp for the data in the second location compared to other time stamps.

15. A computer program product for a streaming media cache including a processor and a cache buffer, the computer program product comprising:
   a tangible medium on which are stored:
   code that directs the processor to determine a first location within the cache buffer that is to be retired in response to a first retirement algorithm;
   code that directs the processor to write data from a mass storage device to the first location;
   code that directs the processor to determine a cache buffer age in response to an age of data within a second location within the cache memory;
   code that directs the processor to compare the cache buffer age to a first threshold age;
   code that directs the processor to determine a third location within the cache buffer that is to be retired in response to a second retirement algorithm when the first threshold age exceeds the cache buffer age; and
   code that directs the processor to write data from the mass storage device to the third location.

16. The computer program product of claim 15 wherein the tangible medium also comprises code implementing the first retirement algorithm, wherein the first retirement algorithm comprises an algorithm configured to identify a least recently used location within the cache buffer, wherein the least recently used location comprises a location within the cache buffer that includes data having an associated time stamp older than time stamps associated with data within the cache memory.

17. The computer program product of claim 16 wherein the tangible medium also comprises code implementing the second retirement algorithm, wherein the second retirement algorithm comprises an algorithm configured to identify a most recently used location within the cache buffer, wherein the most recently used location comprises a location within the cache buffer that includes data most recently provided from the cache buffer.

18. The computer program product of claim 17 wherein the tangible medium also comprises code that directs the processor to
   code that directs the processor to compare the cache buffer age to a second threshold age;
   code that directs the processor to determine a fourth location within the cache buffer that is to be retired in response to a first retirement algorithm when the cache buffer age exceeds the second threshold age; and
   code that directs the processor to write data from the mass storage device to the fourth location.

19. The computer program product of claim 18 wherein the first threshold age is less than or equal to the second threshold age.

20. The computer program product of claim 15 wherein the cache buffer age is also determined in response to an age of data within a fifth location within the cache memory.

21. A method of operating a streaming media cache, the method comprising:
   storing streaming media data in the streaming media cache;
   determining a cache memory age associated with the streaming media cache;
   selecting a first retirement algorithm, for use in retiring memory locations of the streaming media cache, if the cache memory age has a first relationship to a cache memory age threshold; and
   selecting a second retirement algorithm, for use in retiring memory locations of the streaming media cache, if the cache memory age has a second relationship to the cache memory age threshold.

22. The method of claim 21, wherein the first retirement algorithm is a least recently used (LRU) retirement algorithm.

23. The method of claim 22, wherein the second retirement algorithm is a most recently used (MRU) retirement algorithm.

24. The method of claim 22, wherein the second retirement algorithm is first-in first-out retirement algorithm.

25. A network attached caching device comprising:
   a processor;
   a network interface coupled to the processor;
   a cache memory to store streaming media data; and
   instructions which configure the processor to
      determine a cache memory age associated with the streaming media cache,
      select a first retirement algorithm, for use in retiring memory locations of the cache memory, if the cache memory age has a first relationship to a cache memory age threshold, and
      select a second retirement algorithm, for use in retiring memory locations of the cache memory, if the cache memory age has a second relationship to the cache memory age threshold.

26. The network attached caching device of claim 25, wherein the first retirement algorithm is a least recently used (LRU) retirement algorithm.

27. The network attached caching device of claim 26, wherein the second retirement algorithm is a most recently used (MRU) retirement algorithm.

28. The network attached caching device of claim 26, wherein the second retirement algorithm is first-in first-out retirement algorithm.

29. A network attached caching device comprising:
   a processor;
   a network interface coupled to the processor;
   a cache memory to store streaming media data; and
   a first software subsystem, executable by the processor, to retrieve streaming media data over a network and to provide the streaming media data to a remote client in response to a request from the remote client; and
   a second software subsystem, executable by the processor, to
      store the streaming media data in the cache memory and retrieve the streaming media data from the cache memory;
      determine a cache memory age associated with the cache memory;
      select a first retirement algorithm, for use in retiring memory locations of the cache memory, if the cache memory age has a first relationship to a cache memory age threshold; and
      select a second retirement algorithm, for use in retiring memory locations of the cache memory, if the cache memory age has a second relationship to the cache memory age threshold.

30. The network attached caching device of claim 29, wherein the first retirement algorithm is a least recently used (LRU) retirement algorithm.

31. The network attached caching device of claim 30, wherein the second retirement algorithm is a most recently used (MRU) retirement algorithm.

32. The network attached caching device of claim 30, wherein the second retirement algorithm is first-in first-out retirement algorithm.

* * * * *